United States Patent
Gupta et al.

(10) Patent No.: US 8,700,597 B2
(45) Date of Patent: Apr. 15, 2014

(54) SYSTEMS AND METHODS FOR MANAGING STATISTICAL EXPRESSIONS

(75) Inventors: Sandeep Gupta, Alpharetta, GA (US); James R. Reid, Cumming, GA (US); Matthew P. Welsh, Lawrenceville, GA (US); Shannon M. Cothran, Cumming, GA (US); Sharmistha Das, Alpharetta, GA (US)

(73) Assignee: Equifax, Inc., Atlanta, GA (US)

( * ) Notice: Subject to any disclaimer, the term of this patent is extended or adjusted under 35 U.S.C. 154(b) by 622 days.

(21) Appl. No.: 12/186,682

(22) Filed: Aug. 6, 2008

(65) Prior Publication Data

US 2009/0044096 A1 Feb. 12, 2009

Related U.S. Application Data

(60) Provisional application No. 60/954,369, filed on Aug. 7, 2007.

(51) Int. Cl.
*G06F 7/00* (2006.01)
*G06F 17/30* (2006.01)

(52) U.S. Cl.
USPC .......................................... 707/708; 707/738

(58) Field of Classification Search
USPC ................................. 707/708, 738
See application file for complete search history.

(56) References Cited

U.S. PATENT DOCUMENTS

| | | | |
|---|---|---|---|
| 5,262,941 A | 11/1993 | Saladin et al. | |
| 5,404,509 A | 4/1995 | Klein | |
| 5,414,838 A * | 5/1995 | Kolton et al. | 705/36 R |
| 5,583,760 A | 12/1996 | Klesse | |
| 5,696,907 A | 12/1997 | Tom | |
| 5,721,903 A | 2/1998 | Anand et al. | |
| 5,778,357 A | 7/1998 | Kolton et al. | |
| 5,797,133 A | 8/1998 | Jones et al. | |

(Continued)

FOREIGN PATENT DOCUMENTS

| | | |
|---|---|---|
| CA | 2312641 | 12/2000 |
| WO | WO 02071393 | 9/2002 |

(Continued)

OTHER PUBLICATIONS

Friedland, Marc "CUs move toward industry-specific scoring," Credit Union News, v15, n16, two pages (Aug. 25, 1995).

(Continued)

*Primary Examiner* — Mariela Reyes
(74) *Attorney, Agent, or Firm* — Kilpatrick Townsend & Stockton LLP

(57) ABSTRACT

Using natural language-like user inputs to provide statistics on a subset of data is described. In one embodiment, a user input that includes at least one word or phrase representing a rule is received. The rule includes an identification of a subset of data and a statistical expression to be performed on the subset of data. The subset of data includes at least part of the data elements of a data set. Each data element includes information on an individual or group. Instructions are provided for translating the rule into an executable format. The executable format includes a translated identification of the subset and a translated statistical expression. The subset of the data is accessed using the translated identification of the subset. The translated statistical expression is executed to obtain statistics on data elements of the subset of data. The statistics on the data elements are provided.

19 Claims, 5 Drawing Sheets

(56) References Cited

U.S. PATENT DOCUMENTS

| | | | |
|---|---|---|---|
| 5,870,721 A | 2/1999 | Norris | |
| 5,926,784 A | 7/1999 | Richardson et al. | |
| 5,930,764 A | 7/1999 | Melchione et al. | |
| 5,940,811 A | 8/1999 | Norris | |
| 5,963,894 A | 10/1999 | Richardson et al. | |
| 6,052,694 A | 4/2000 | Bromberg | |
| 6,067,549 A | 5/2000 | Smalley et al. | |
| 6,073,129 A | 6/2000 | Levin et al. | |
| 6,088,686 A | 7/2000 | Walker et al. | |
| 6,105,007 A | 8/2000 | Norris | |
| 6,163,781 A | 12/2000 | Wess, Jr. | |
| 6,195,662 B1* | 2/2001 | Ellis et al. | 1/1 |
| 6,240,422 B1 | 5/2001 | Atkins et al. | |
| 6,256,640 B1 | 7/2001 | Smalley et al. | |
| 6,263,447 B1 | 7/2001 | French et al. | |
| 6,282,658 B2 | 8/2001 | French et al. | |
| 6,285,380 B1 | 9/2001 | Perlin et al. | |
| 6,285,998 B1 | 9/2001 | Black et al. | |
| 6,295,536 B1 | 9/2001 | Sanne | |
| 6,321,206 B1 | 11/2001 | Honarvar | |
| 6,321,339 B1 | 11/2001 | French et al. | |
| 6,343,279 B1 | 1/2002 | Bissonette et al. | |
| 6,356,903 B1 | 3/2002 | Baxter et al. | |
| 6,401,098 B1 | 6/2002 | Moulin | |
| 6,405,173 B1 | 6/2002 | Honarvar et al. | |
| 6,415,259 B1 | 7/2002 | Wolfinger et al. | |
| 6,415,298 B1 | 7/2002 | Oesterer et al. | |
| 6,424,979 B1 | 7/2002 | Livingston et al. | |
| 6,430,545 B1 | 8/2002 | Honarvar et al. | |
| 6,430,556 B1 | 8/2002 | Goldberg et al. | |
| 6,456,986 B1 | 9/2002 | Boardman et al. | |
| 6,463,439 B1 | 10/2002 | Dahlberg | |
| 6,496,936 B1 | 12/2002 | French et al. | |
| 6,523,028 B1 | 2/2003 | DiDomizio et al. | |
| 6,532,450 B1 | 3/2003 | Brown et al. | |
| 6,546,545 B1 | 4/2003 | Honarvar et al. | |
| 6,557,009 B1 | 4/2003 | Singer et al. | |
| 6,598,067 B1 | 7/2003 | Wydra et al. | |
| 6,601,034 B1 | 7/2003 | Honarvar et al. | |
| 6,606,740 B1 | 8/2003 | Lynn et al. | |
| 6,609,120 B1 | 8/2003 | Honarvar et al. | |
| 6,611,809 B1 | 8/2003 | McCalden | |
| 6,621,930 B1 | 9/2003 | Smadja | |
| 6,643,625 B1 | 11/2003 | Acosta et al. | |
| 6,684,192 B2 | 1/2004 | Honarvar et al. | |
| 6,741,982 B2 | 5/2004 | Soderstrom et al. | |
| 6,823,319 B1 | 11/2004 | Lynch et al. | |
| 7,003,560 B1 | 2/2006 | Mullen et al. | |
| 7,010,546 B1 | 3/2006 | Kolawa et al. | |
| 7,136,873 B2 | 11/2006 | Smith et al. | |
| 7,181,438 B1 | 2/2007 | Szabo | |
| 7,191,150 B1 | 3/2007 | Shao et al. | |
| 7,380,213 B2 | 5/2008 | Pokorny et al. | |
| 7,747,559 B2 | 6/2010 | Leitner et al. | |
| 8,108,301 B2 | 1/2012 | Gupta et al. | |
| 2002/0026443 A1 | 2/2002 | Chang et al. | |
| 2002/0040339 A1 | 4/2002 | Dhar et al. | |
| 2002/0069193 A1 | 6/2002 | Beavin et al. | |
| 2002/0077964 A1 | 6/2002 | Brody et al. | |
| 2002/0116244 A1 | 8/2002 | Honarvar et al. | |
| 2002/0165855 A1* | 11/2002 | Ohtomo | 707/3 |
| 2002/0194120 A1 | 12/2002 | Russell et al. | |
| 2003/0033289 A1 | 2/2003 | Brinker et al. | |
| 2003/0110112 A1 | 6/2003 | Johnson et al. | |
| 2003/0120529 A1 | 6/2003 | Honarvar et al. | |
| 2003/0144950 A1 | 7/2003 | O'Brien et al. | |
| 2003/0163414 A1 | 8/2003 | O'Brien et al. | |
| 2003/0177079 A1 | 9/2003 | Krajewski et al. | |
| 2003/0195828 A1 | 10/2003 | Honarvar et al. | |
| 2003/0204426 A1 | 10/2003 | Honarvar et al. | |
| 2004/0039687 A1 | 2/2004 | Lent et al. | |
| 2004/0054610 A1 | 3/2004 | Amstutz et al. | |
| 2004/0078320 A1 | 4/2004 | DeFrancesco et al. | |
| 2004/0088158 A1* | 5/2004 | Sheu et al. | 704/9 |
| 2004/0098359 A1 | 5/2004 | Bayliss et al. | |
| 2004/0098371 A1 | 5/2004 | Bayliss et al. | |
| 2004/0098372 A1 | 5/2004 | Bayliss et al. | |
| 2004/0098373 A1 | 5/2004 | Bayliss et al. | |
| 2004/0098374 A1 | 5/2004 | Bayliss et al. | |
| 2004/0098390 A1 | 5/2004 | Bayliss et al. | |
| 2004/0148271 A1 | 7/2004 | Wood | |
| 2005/0086579 A1 | 4/2005 | Leitner | |
| 2005/0154692 A1* | 7/2005 | Jacobsen et al. | 706/47 |
| 2007/0022027 A1 | 1/2007 | Gupta et al. | |
| 2007/0118519 A1 | 5/2007 | Yamasawa et al. | |
| 2007/0179827 A1 | 8/2007 | Gupta et al. | |
| 2009/0048999 A1 | 2/2009 | Gupta et al. | |
| 2009/0112753 A1 | 4/2009 | Gupta et al. | |

FOREIGN PATENT DOCUMENTS

| | | |
|---|---|---|
| WO | WO 2004/114160 | 12/2004 |
| WO | WO 2005/022348 | 3/2005 |
| WO | WO 2009/021011 | 2/2009 |

OTHER PUBLICATIONS

Anonymous, "Credit scoring primer," ABA Bank Compliance, v17, n5, two pages (May 8, 1996).

Computer Finance, v7, n8, "The Data Clean-Up Payback Calculation—Pt. 1," seven pages (Jan. 1, 1997).

Aleskerov, et al., "CARDWATCH: a neural network based database mining system for credit card fraud detection," ABSTRACT, Proceedings of the IEEE/IAFE 1997 Computational Intelligence for Financial Engineering (CIFEr), one page, (Mar. 24-25, 1997).

Business Wire, "QSpace.com Teams with the Forms Group to Offer Instant Web-Loan Decisioning to Community Banks," three pages (Mar. 22, 2000).

Knauf, Lynn "Insurers look to demystify credit scoring," National Underwriter, v105, n50, three pages (Dec. 10, 2001).

Rezaee, et al., "Continuous auditing: Building automated auditing capability," Auditing, v21, n1, eighteen pages (Mar. 2002).

Non-Final Office Action, for U.S. Appl. No. 12/257,442 mailed Feb. 2, 2010, fifteen pages.

Notice of Allowance and Interview Summary for U.S. Appl. No. 10/868,476, mailed Feb. 17, 2010, twelve pages.

Seisint TM Brochure Entitled "Seisint Data Supercomputer Overview" pp. 1-7 Version 1.0 Mar. 2004.

Evans, et al., "Specifications" Online! XP002315765 Martin Fowler Homepage http:--martinfowler.com-apsupp-spec.pd pp. 1-19 (Mar. 23, 2003).

Fowler "Patterns of Enterprise Application Architecture" Addison Wesley and Benjamin Cummings XP002315766 pp. 316-327 (Nov. 2002).

Han Jiawei, et al. Data Mining: Concepts and Techniques Morgan Kaufman Publishers 340 Pine Street 6th Floor San Francisco California XP002332057 pp. 5-15 23 45-47 58-61 119-121 453-454 (2001).

Lobel Guido, et al. "Lexikon der Datenverarbeitung" Verlag Moderne Industrie 8910 Landsberg Germany XP002332058 pp. 656-663 (1982).

Pressman "Software Engineering: A Practitioner's Approach" McGraw Hill Publishing Company Shoppenhangers Road Maidenhead Berkshire SL6 2QL XP002315833 pp. 610-616 (1994).

Rob Peter, et al. "Database Systems: Design Implementation and Management 2nd Edition" International Thomson Publishing Inc. One Corporate Place Ferncroft Village Danvers Massachusetts 01923 USA p. 125-130 (1995).

Zoot Enterprises Inc. CB Manual Bozeman MT (Sep. 24, 2000).

Zoot Enterprises Inc. untitled Bozeman MT (Jun. 10, 1996).

Zoot Enterprises Inc. WebRules: Release 5.0 Enhancements Bozeman MT (Dec. 16, 2002).

Zoot Enterprises Inc. Web Applications Bozeman MT (2004).

Zoot Enterprises Inc. WebRules: Criteria Development Tool Functionality Summary Version 5.0 Bozeman MT (2003).

Zoot Enterprises Inc. WebRules: Zoot Criteria Development Tool Release Notes Version 5.0 Production Install Bozeman MT (Jul. 7, 2003).

(56) References Cited

OTHER PUBLICATIONS

Zoot Enterprises Inc. SPOC Decision Engine Bozeman MT (2003).
International Search Report in related Application No. PCT/US2004/019136, dated Sep. 1, 2005.
International Preliminary Report on Patentability and Written Opinion in related Application No. PCT/US2004/019136, dated Dec. 13, 2005.
International Search Report in related Application No. PCT/US2004/028020, dated May 24, 2007.
International Preliminary Report on Patentability and Written Opinion in related Application No. PCT/US2004/028020, dated Apr. 17, 2007.
Non-Final Office Action for U.S. Appl. No. 10/546,931, dated Aug. 28, 2008.
Non-Final Office Action for U.S. Appl. No. 10/868,476, mailed Nov. 10, 2008.
Non-Final Office Action for U.S. Appl. No. 10/546,931, mailed Dec. 23, 2008.
Final Office Action for U.S. Appl. No. 10/868,476, mailed Feb. 23, 2009.
Non-Final Office Action for U.S. Appl. No. 12/257,442, mailed Jul. 8, 2010, sixteen pages.
Response to Non-Final Office Action for U.S. Appl. No. 12/257,442, filed Aug. 20, 2010, twenty pages.
Amendment and Response to non-final Office Action for U.S. Appl. No. 10/546,931, filed Aug. 20, 2010, twenty-three pages.
Amendment and Response to Final Office Action for U.S. Appl. No. 12/257,442, filed Sep. 15, 2010, (22 pages).
Amendment and Response to Final Office Action for U.S. Appl. No. 10/546,931, filed Dec. 2, 2009, twenty-eight pages.
Amendment and Response to Non-Final Office Action for U.S. Appl. No. 12/257,453, filed Dec. 30, 2009, thirteen pages.
Final Office Action for Serial No. Final Office Action for U.S. Appl. No. 12/257,453, mailed Mar. 30, 2010, sixteen pages.
Amendment and Response to Final Office Action for U.S. Appl. No. 10/546,931, filed Mar. 31, 2010, twenty-five pages.
Amendment and Response to Final Office Action for U.S. Appl. No. 12/257,453, filed May 26, 2010, seventeen pages.
Non-Final Office Action for U.S. Appl. No. 10/546,931 mailed May 25, 2010, twenty-three pages.
Amendment and Response to U.S. Appl. No. 12/257,442, filed Jun. 2, 2010, eighteen pages.
Non-Final Office Action for U.S. Appl. No. 10/868,476, mailed Sep. 22, 2009.
Amendment and Response to non-final Office Action for U.S. Appl. No. 12/257,442, filed Oct. 2, 2009.
Non-Final Office Action for U.S. Appl. No. 12/257,453, mailed Oct. 2, 2009.
Final Office Action for U.S. Appl. No. 10/546,931, mailed Oct. 1, 2009.
Response to Non-Final Office Action dated May 22, 2009 in U.S. Appl. No. 10/546,931.
Amendment and Response to Final Office Action for U.S. Appl. No. 10/868,476, filed Jun. 17, 2009.
Non-Final Office Action for U.S. Appl. No. 12/257,442, mailed Jul. 2, 2009.
International Application Serial No. PCT/US2008/072297, Search Report and Written Opinion dated Mar. 30, 2009.
Office Action for European Patent Application No. 04782491.7, mailed May 12, 2010 (6 Pages).
Office Action for European Patent Application No. 04782491.7, mailed Dev. 21, 2007 (1 pages).
Non-Final Office Action for U.S. Appl. No. 10/868,476, mailed Feb. 5, 2008 (24 Pages).
Advisory Action for U.S. Appl. No. 10/546,931, mailed Feb. 2, 2010 (3 Pages).
Advisory Action for U.S. Appl. No. 10/546,931, mailed Feb. 5, 2010 (3 Pages).
Final Office Action for U.S. Appl. No. 12/257,442, mailed Nov. 11, 2010 (16 pages).
Non-Final Office Action for U.S. Appl. No. 10/546,931, mailed Jan. 4, 2011 (17 Pages).
International Preliminary Report on Patentability for PCT/US2008/072297, mailed Feb. 18, 2010 (6 Pages).
International Search Report for PCT/US2008/072297, mailed Mar. 30, 2009 (1 Pages).
Notice of Allowance for U.S. Appl. No. 10/546,931, mailed Feb. 22, 2011 (15 pages).
Advisory Action for U.S. Appl. No. 12/257,453, mailed Aug. 18, 2010 (3 pages).
Non-Final Office Action for U.S. Appl. No. 12/257,453, mailed Jun. 27, 2011 (16 pages).
Response to Non-Final Office Action for U.S. Appl. No. 12/257,453, filed Sep. 27, 2011 (14 pages).
Advisory Action for U.S. Appl. No. 12/257,442, mailed Dec. 22, 2010 (3 pages).
Notice of Allowance for U.S. Appl. No. 12/257,442, mailed Sep. 29, 2011 (19 pages).
Carpenter, Mark J., "Decision-Support Software Speeds Credit Analysis", Commercial Lending Review, 7(1), Winter 1991-92 (6 pages).
Covaliu, Zvi, "Decision Analysis: Concepts, Tools and Promise", A Fair Isaac White Paper, May 2001 (18 pages).
Kanungo, et al., "Evaluation of a decision support system for credit management decisions", Decision Support Systems, ISSN 0167-9236, Sep. 29, 2011 (18 pages).
Lee, "Equifax Aims to Get Closer to Lenders With Analytics", American Banker, Apr. 1, 2004 (2 pages).
Extended Search Report for European Application No. 08797250.1, mailed on Aug. 5, 2011 (6 pages).
Mangivacchi, et al., "Innovative learning capabilities in a natural language user interface for computer based measurement systems," Instrumentation and Measurement, IEEE Transactions, vol. 39 Issue 1, Feb. 1990, (5 pages).
German Version—Niedemair, "Datenbankdialog in gesrprochener Sprache-Linguistische Analyse in SPICOS II," IT Informationstechnik, Oldenbourg Verlag, Munche, DE, vol. 31, No. 1, Dec. 31, 1989 (10 pages).
English Version—Niedermair, "Database-Dialog in Spoken Language-Linguistic Analysis in SPICOS II," IT Informationstechnik, Oldenbourg Verlag, Munich, DE, vol. 31, No. 6, Dec. 31, 1989 (14 pages).
Responses to Rule 70(2) and 70a(2) EPC for European Application No. EP08797250.1, filed on Feb. 23, 2012 (22 pages).

\* cited by examiner

| ATTRIBUTES ||
|---|---|
| Statistic Definition | Statistic Result |
| Number of Bank Cards opened in the last 3 months with balance due greater than $2000 | 3 |
| Debt Ratio Percentage (Balance/High Credit on Mortgage Trades | 0.45672 |
| Average Date Opened (in months) on Open Installment Trades | 36 |
| Most Recent Date (in months) on Derogatory Trades over the past 36 months | 22 |
| Sum of the Balances outstanding on All Open Revolving and Installment Trades (exclude Mortgage and Auto) | 16,830 |

Figure 4

SYSTEMS AND METHODS FOR MANAGING STATISTICAL EXPRESSIONS

CROSS-REFERENCE TO RELATED APPLICATIONS

This application claims priority to U.S. Provisional Patent Application No. 60/954,369, filed Aug. 7, 2007 and entitled "Systems and Methods for Managing Statistical Expressions," the entirety of which is hereby incorporated by reference.

FIELD OF THE DISCLOSURE

Embodiments of the present invention relate to systems and methods for processing information, and specifically to systems and methods for writing and processing statistical expressions in a natural language-like syntax and/or other grammar form.

BACKGROUND

Certain organizations, such as credit reporting companies, maintain databases that contain identification, commercial, credit and other information about many individuals and groups around the world or in a particular geographic region. Among other uses of such databases, lists of certain individuals and/or groups fitting certain criteria and/or attributes can be provided and organized as desired for various purposes. One purpose can include marketing. For example, a business user or entity may request information about groups and/or individuals who reside in Atlanta, Ga., and who are in a certain income category, and thus are potentially receptive to a certain marketing campaign.

To obtain data, such as for marketing purposes, the business user often specifies a set of criteria and attributes, as well as desired formats of the responsive data to be delivered, to a credit reporting company that maintains or otherwise can access the databases. Conventional methods and systems often involve considerable manual effort throughout such processes in order to interpret and program the business user's request into an executable computer code or a program which can operate on the relevant databases.

For example, the business user may need to explain the type of information that is needed to a computer programmer associated with the credit reporting company. The computer programmer then writes a mathematical formula or program to perform the analysis and/or functions to execute on the data to be searched in order to return the requested information. Because the data may be stored in an old, large mainframe, the program that is ultimately written may be quite complicated and involved (i.e., not in a language that is recognizable by the business user). Once the program is written, the programmer tests the performance of the code or program against actual or trial data to assure that it will provide the desired data subsets. The manual effort involved in modeling, formatting, and testing programming to return results in desired form, auditing the results, and other aspects of delivering the desired results to the commercial organization can be time consuming and expensive.

An early attempt at creating a computer programming language that includes instruction sets and communication protocols, as well as notations for representing parts of natural language grammars, is the Backus-Naur Form (BNF). BNF is a mechanism that can be used to define grammar, but it is not a grammar itself. Extended Backus-Naur Form (EBNF) is an extension of the basic BNF notation that uses one or more words joined together by hyphens and a normal character representing each operator that has an implied precedence based on its order.

In addition to BNF and EBNF, a business rule management system (BRMS) is a tool that can take the business logic out of procedural code and put it in the hands of business users. BRMS is a way to extract and isolate business rules from control code to allow business users to configure the rules (e.g., for discount pricing, loan interest rates, insurance premiums, and so forth) using if-then-else statements. Examples of such tools are ILOG's JRULES™ and Fair Isaac's "Blaze Advisor." JRULES™ uses Business Action Language (BAL), which the programmer uses to describe an application's objects, attributes, and methods in the language of the business user. Once a programmer configures the BAL, a graphical user interface allows business users to build rules by selecting pre-determined phrases and logical operators from a tree provided. When the rules are in place and the logic is fixed, variables can be easily changed. This prevents business people from having to explain a business rule to a programmer, who then translates it into Java or other computer language.

One of the challenges that still exists, however, is defining how the plain English version of the rule should appear. In JRULES™ and Blaze Advisor, a user needs to know the language to complete a rule. Although a typical business user could easily explain the concept to be searched using the translation, the business user may be challenged to write the rule in the first form presented.

Other systems have attempted to solve these problems by providing automated criteria and attribute selection by allowing an information requester access to a screen that includes options to "drag and drop" or "point and click" the desired criteria into a search form in order to design their own search. An example of such a system is shown and described in U.S. patent application Ser. No. 10/868,476, titled "Systems and Processes for Automated Criteria and Attribute Generation, Searching, Auditing, and Reporting of Data" filed on Jun. 14, 2004. Words or phrases may be strings that are provided in a tree. The strings in the tree may be limited to those of appropriate type in view of the context provided by the user input. For example, the context provided by the user input may signal the attribute engine to limit the strings in the tree to a numeric value. The tree may be restricted to strings that are the names of JAVA class member types for the class identified by the user input grammar or valid values for the argument type selected by the user. The JAVA class member types may be class n-ary member types, single member types, and not primitive types. The selection of a word or phrase in a tree can cause the abstract tree syntax (AST) of the word or phrase selected to be included in the phrase that is being developed. The user may also assign a word or phrase to a JAVA class. The user defined word or phrase may be included in the tree or able to be directly included in the phrase being developed.

One benefit of such a system is that it allows the business user to actually create his/her own search using terms that are understandable to a business user, rather than the business user having to describe the desired search to a programmer who then creates the search parameters. Although such systems are generally user friendly, they still require a user to know particular formats or languages to implement mathematical functions that may be unnatural to a person with limited to no experience. Moreover, some systems allow business users to identify a type of data on which to search, but do not allow business users to identify statistical measures to use on the identified data.

Accordingly, it is desirable for user-friendly, rules-based systems and methods that can help bridge the gap between programmers and business users. It is also desirable for systems and methods that can allow the business users to understand the language with which their request is being implemented. It is also desirable for systems and methods that can help companies identify instances in which previous rules that were implemented in code are wrong or areas where business logic may be missing entirely.

SUMMARY

In an embodiment, a method for receiving a user input that includes at least one word or phrase representing a rule is provided. The rule includes an identification of a subset of data and a statistical expression to be performed on the subset of data. The subset of data includes at least part of the data elements of a data set. Each data element includes information on an individual or group. Instructions are provided for translating the rule into an executable format. The executable format includes a translated identification of the subset and a translated statistical expression. The subset of the data is accessed using the translated identification of the subset. The translated statistical expression is executed to obtain statistics on data elements of the subset of data. The statistics on the data elements are provided.

In another embodiment, a system is provided that includes a user interface and an attribute engine. The user interface is generated by an interface engine stored on a computer-readable medium. The user interface includes inputs for receiving at least one word or phrase representing a rule. The rule includes an identification of a subset of a data set and a representation of a statistical expression to be performed on the subset of the data set. The data set includes information on individuals or groups. The attribute engine is stored on the computer-readable medium and can provide instructions for translating the rule into an executable format and provide statistics based on the rule to the user interface. The user interface can display the statistics.

These illustrative embodiments are mentioned not to limit or define the inventive concepts disclosed herein, but to provide examples to aid understanding thereof. Other aspects, advantages, and features of the present disclosure will become apparent after review of the entire application, including the following sections: Brief Description of the Drawings, Detailed Description, and the Claims.

BRIEF DESCRIPTION OF THE DRAWINGS

These and other features, aspects, and advantages of the present invention are better understood when the following Detailed Description is read with reference to the accompanying drawings, wherein:

FIG. 4 illustrates a user interface for providing statistics according to one embodiment of the present invention.

DETAILED DESCRIPTION

Various aspects and embodiments of the present invention provide a natural language-like, grammar-based syntax that is an expression that can be used to develop a rule. The rule may be represented by a word or phrase received via a user interface. The rule may be translated to identify a subset of data and generate a translated statistical expression that is in an executable format. The statistical expression can identify attributes with which statistics are generated on the subset of data. The identified subset of data may be a subset of a data set that includes information on individuals and/or groups. The translated statistical expression can be applied to the identified subset to generate statistics on the information in the subset. The statistics can be provided to a business user via the user interface. An example of the statistics includes attributes of the subset.

The information may be any type of information useful for marketing or other purposes. Examples of the information include credit-related data, income data, employment data, criminal history, credit score, commercial activity, public record data, age, sex, and address. The data set can include data elements that include data on an individual or group for a type of information. The data elements can be grouped into subsets based on the type of information, the individual or group, or any other characteristic. In some embodiments, the data elements can be grouped into subsets based on two or more characteristics.

In one embodiment, the user can input a natural language-like word or phrase and a list of selectable, related words, phrases, symbols, and/or mathematical expressions may be generated based on the user input. The user can select a word or phrase to generate an expression. These steps may be repeated until a complete expression that is a rule representing an identification of a subset of data and a statistical expression is generated. The subset identification and statistical expression are translated into an executable format by a software application. An example of the software application is JRULES™ from ILOG Inc. The executable format includes a translated statistical expression and translated subset identification. The translated subset identification is used to determine a subset of data on individuals and/or groups. The translated statistical expression is executed on the subset to generate results that may be statistics that can be supplied to the user. Certain embodiments of the present invention provide a user with limited or no knowledge or experience with developing parameters and/or functions via expressions to generate statistics using attributes and selected data subsets.

Illustrative System Implementation

Figure 1:
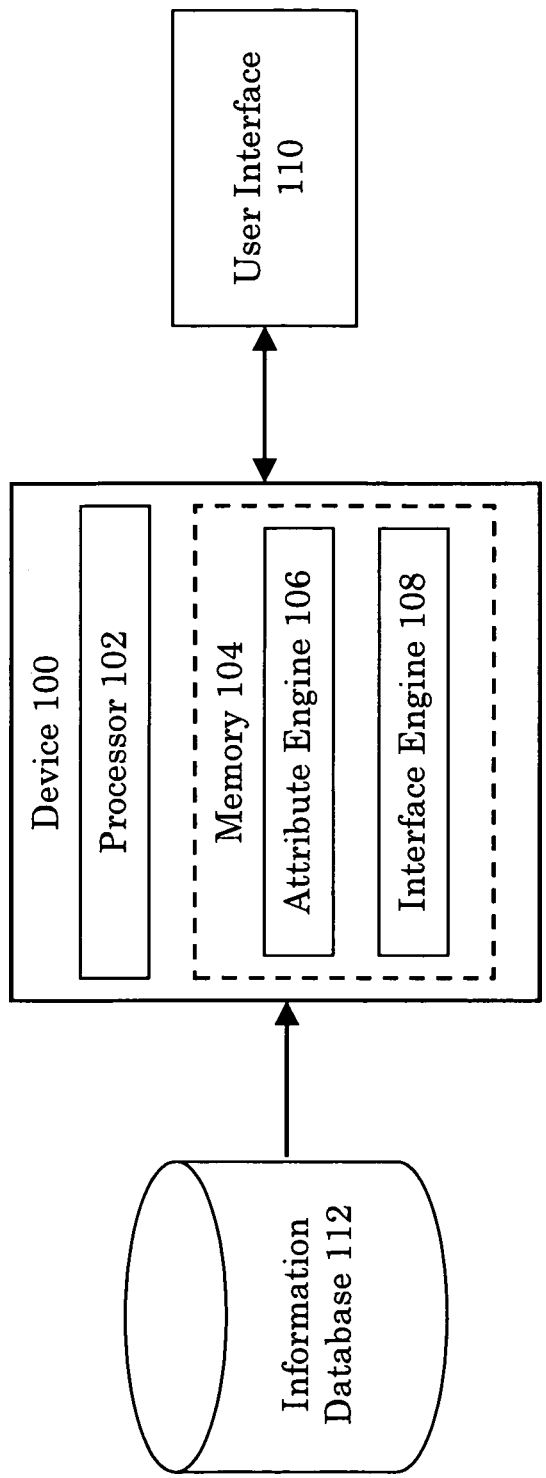
FIG. 1 is a block diagram of a system for using rules represented by words or phrases to provide statistics on a subset of data according to one embodiment of the present invention.

Methods according to various embodiments of the present invention may be implemented on a variety of different systems. An example of one such system is illustrated in FIG. 1. The system includes a processor-based device 100 that includes a processor 102 and a computer-readable medium, such as memory 104. The device 100 may be any type of processor-based device, examples of which include a computer and a server such as a web server or otherwise. Memory 104 may be adapted to store computer-executable code and data. Examples of memory 104 include a database, magnetic or optical storage medium, and random access memory.

Computer-executable code may include an attribute engine 106 that, as described in more detail below, may be adapted to perform methods or parts of methods according to various embodiments of the present invention to receive a rule represented by a word or phrase and provide statistics on a data subset using the rule. The statistics may be one or more attributes of the data subset. The computer-executable code can also include an interface engine 108 that is adapted to generate and provide a user interface 110 on which inputs can be received from a user and outputs can be provided to a user. The attribute engine 106 and interface engine 108 may be separate applications. In some embodiments, the interface engine 108 is located on a separate device than attribute engine 106. In other embodiments, the attribute engine 106 includes the interface engine 108.

In some embodiments, the user interface 110 is a web page that is provided over a network, such as the Internet, to a remotely located user device. The user device can be configured to display it, such as by using a web browser or other application. In other embodiments, the user interface 110 is provided to an output device, such as a monitor, coupled to the device 100. A user can use an input device coupled to the device 100, such as a keyboard or mouse, to provide inputs to the user interface 110. In some embodiments, the user may be required to supply authentication credentials to the device 100 via an input device before access to information and tools stored in the device 100 is granted to the user. For example, the attribute engine 106 may receive the credentials from input device and access data in a local storage to determine if the credentials match stored credentials and to identify the user.

The inputs can include a word or phrase representing a rule. The rule can identify a subset of a data set, such as a data set stored in information database 112, and represent a statistical expression. In some embodiments, the identification of the subset includes one or more filters by which the subset is determined. The statistical expression can include attributes, criteria, functions, or other expressions with which statistics on the subset of the data set can be generated. The statistics can include attributes with which business users can implement a business objective such as a marketing campaign.

The information database 112 can be coupled to the device 100 via a network, such as the Internet or an intranet, or directly coupled via wireline or wireless connection. The information database 112 may be any type of database. Examples of information database 112 include a flat-file database and a relational database. In some embodiments, the device 100 includes the information database 112. The information database 112 may be associated with a credit bureau, such as Equifax, TransUnion, and/or Experian, that collects credit-related data and personal information associated with a relatively large number of people or groups within a selected geographical area. The information database 112 can include information on individuals and/or groups. Examples of information include credit-related data, income data, employment data, criminal history, credit score, commercial activity, public record data, age, sex, address, and any type of information useful for marketing or other purposes. The information can include data elements. Each data element includes data on an individual or group for a type of information. The data elements can be filtered into subsets based on the translated rule.

The attribute engine 106 can be configured to use the identification of the subset of a data set from the translated rule to obtain the subset from the information database 112. The subset may be part of the data stored in the information database 112 that meets certain criteria or other requirements identified by the rule. Examples of a subset of data include information on all individuals living in a particular state, over the age of eighteen, and having an income above a certain threshold. As explained in more detail below, the attribute engine 106 can be configured to perform the statistical expression on the subset and generate statistics. The statistics can be useful for marketing or other purposes, or otherwise helpful information for a business user to execute his or her business objective. The natural language-like syntax for providing the rule may allow business users to manage requests in a more preferred and efficient manner.

Illustrative Statistical Expression Management Method

Figure 2:
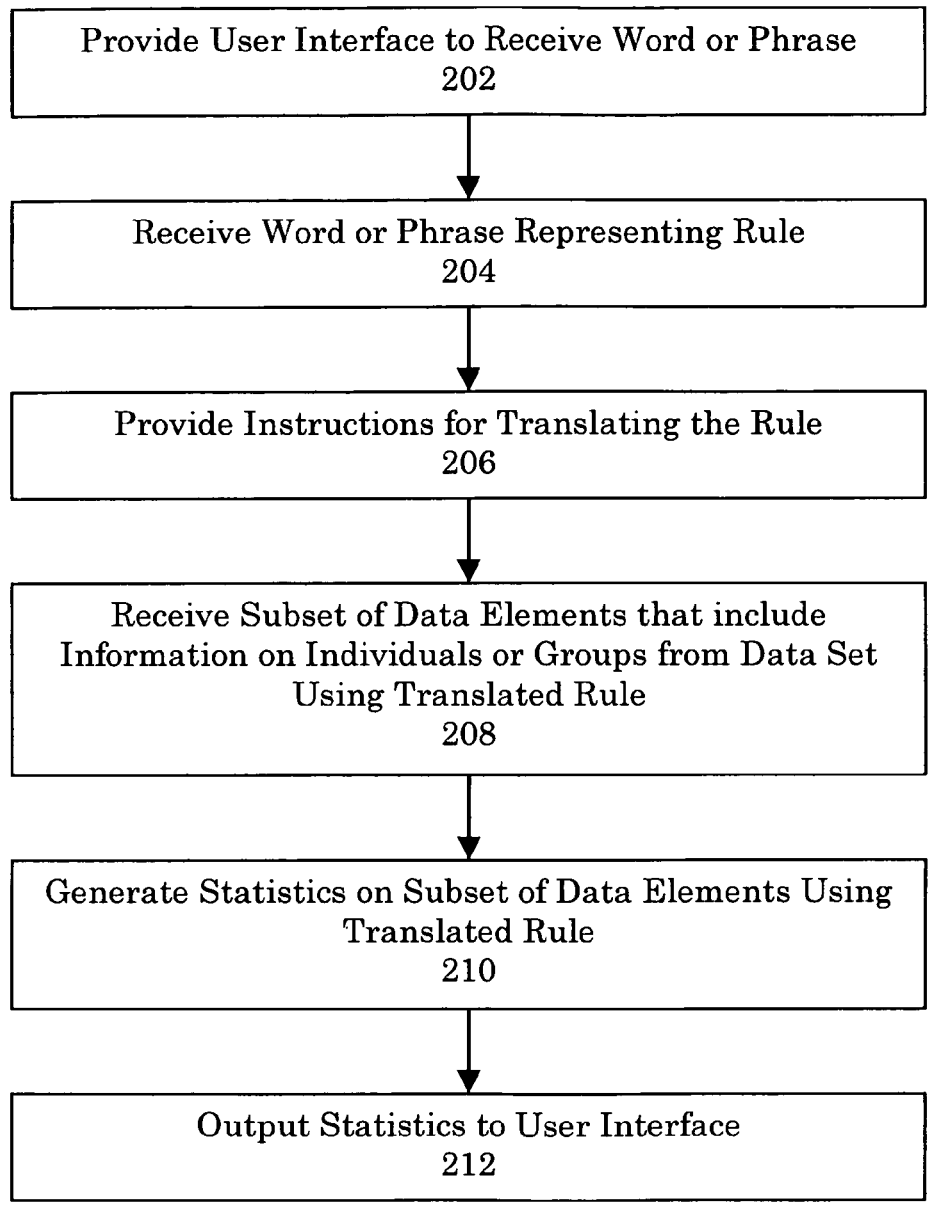
FIG. 2 is a flow chart of a process for using a rule represented by a word or phrase to provide statistics on a subset of data according to one embodiment of the present invention.

Various methods according to various embodiments of the present invention can be used to manage statistical expressions and receive rules that include a word or phrase representing a statistical expression to provide statistics on a subset of data. FIG. 2 illustrates one embodiment of a method for providing statistics on a subset of data using a rule representing a statistical expression. For purposes of illustration only, the elements of this method are described with reference to the system depicted in FIG. 1 and screen shots illustrated in FIGS. 3-4. Other implementations are possible.

In block 202, the interface engine 108 provides a user interface 110 to receive a word or phrase representing a rule. The user interface 110 may be a web page transmitted over a network to a user device that is configured to display the user interface 110 to the user. In other embodiments, the user interface 110 may be provided to an output device, such as monitor coupled to the device 100, for display. The user interface 110 can be a modifiable displayed page or collection of pages that can include inputs to receive at least one word or phrase representing a rule. For example, the user interface 110 may include one or more areas in which users can provide text, such as a word or phrase. In some embodiments, the user interface 110 provides a selectable tree by which users can select a word, phrase, or other symbol to formulate a rule. The rule can identify a subset of data in the information database 112 and a statistical expression to perform on the subset to generate statistics.

Figure 3:
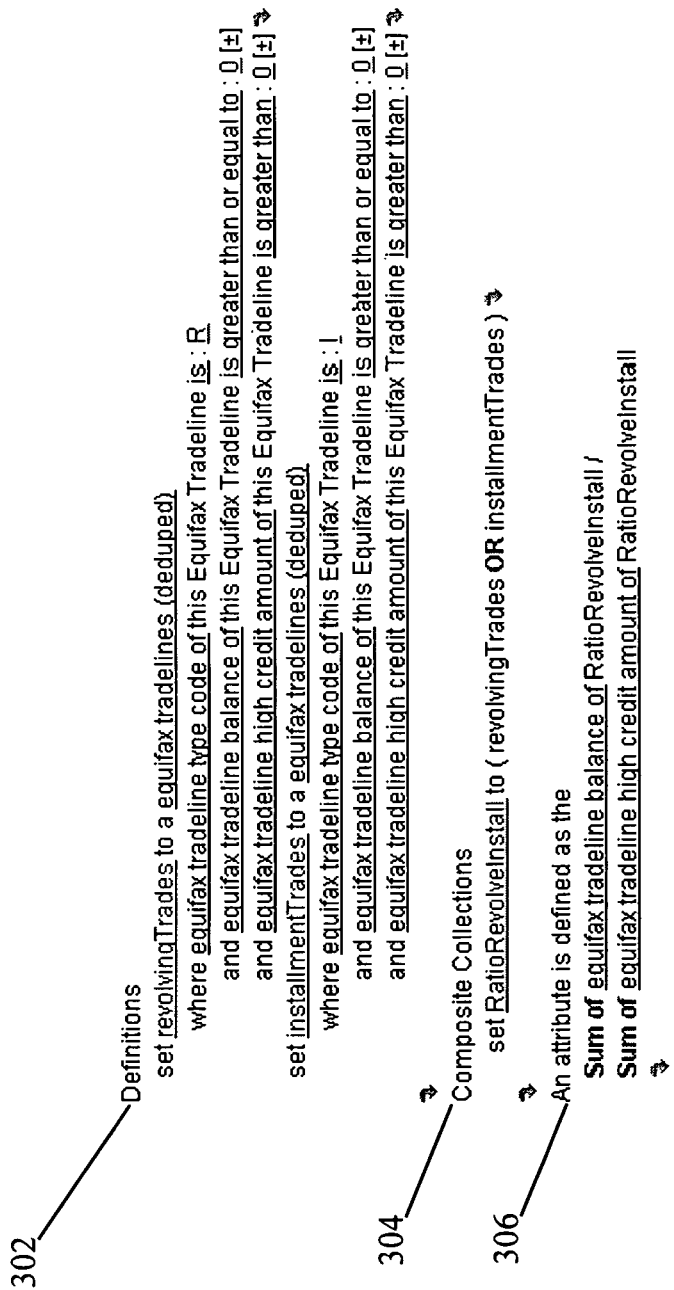
FIG. 3 illustrates a user interface for receiving rules represented by words or phrases according to one embodiment of the present invention.

Examples of words or phrases can include prepositions, transitional phrases, attributes, categories of information, parameters such as <, >, or =, or any phrase representing an additional part of the statistical expression or subset identification. FIG. 3 illustrates an example of a user interface 110 according to some embodiments of the present invention. The user interface 110 includes three sections: definitions 302, composite collections 304, and "An attribute is defined as the" 306. The user first may develop definitions 302. In the definition stage, the user interface 110 provides the word "set" to the user as a starting point so that the user will know they can provide a word or phrase to define. The user may then provide the grammar input of "revolvingTrades" as the word or phrase to define.

The user interface 110 displays the grammar input and may automatically display the phrase "to a" based on the context of "set revolvingTrades." The phrase "equifax tradelines (deduped)" may be selected by the user from a tree provided by the user interface 110 that lists words and phrases that a user may logically select next after "set revolvingTrades to a." The phrase "equifax tradelines (deduped)" is automatically placed in the developing phrase after it is selected by the user. The word "where" may be selectable by the user if additional parameters regarding the definition of "revolvingTrades" is desired. In the example shown in FIG. 3, the "where" is selected to provide additional parameters or attributes associated with the definition of "revolvingTrades." Users may define additional definitions. In the example shown, a definition of "installmentTrades" is developed in accordance, for example, with the method described above. In some embodiments, the definitions may represent a statistical expression or part of a statistical expression. The phrase representing the statistical expression can be translated and executed on a subset of data to provide statistics on the subset of data.

In composition collections 304, a phrase can be developed that represents a function used to identify a subset on which to perform a statistical expression. The phrase "RatioR-evolveInstall" is provided by a user, such as by selecting options on a tree, and it is set to "revolvingTrades OR installmentTrades." The phrase may be subsequently translated to identify a subset of data in information database 112 on which to perform a statistical expression and provide statistics based on the statistical expression.

Section 306 may receive a user input to further represent the statistical expression with which to generate statistics on the subset of data. Section 306 includes user inputs of "equifax tradeline balance" and "equifax tradeline high credit amount of" that are each associated with "Sum of" and "RatioRevolveInstall," automatically or by user input, to represent attributes on which the user wishes to receive statistics of the identified subset of data. In some embodiments, the phrases developed in definitions 302, composite collections 304, and "an attribute is defined as the" 306 sections, taken together, form a rule that includes an identification of a subset of data and a representation of a statistical expression to perform on the subset to generate statistics. The user interface 110 can allow a user to develop the rule using natural language-like syntax and provide it for processing.

In some embodiments of the present invention, the user input may be logical names of definitions that are listed in a tree of available definitions on the user interface 110. The user can review the tree and select the name, causing it to be automatically provided in the statistical expression the user is generating. For example, the tree may include names of JAVA classes available to the user.

Returning to FIG. 2, the attribute engine 106 receives the word or phrase representing the rule from the user interface 110 and, optionally, the interface engine 108 in block 204. The attribute engine 106 may receive the actual phrase provided by the user. In some embodiments, the attribute engine 106 receives a representation of the actual phrase in a selected computer language or other format in which the attribute engine 106 can process. For example, in some embodiments, the phrase may be translated into an executable format before it is received by the attribute engine 106. In other embodiments, the attribute engine 106 is configured to translate the phrase into an executable format. An executable format can include a known computer programming language, machine language, or otherwise.

In block 206, and if the attribute engine 106 is not configured to translate the phrase, the attribute engine 106 can provide instructions for translating the rule represented by the word or phrase. For example, the attribute engine 106 can provide instructions to a separate application, such as JRULES™, that is configured to translate the rule using the instructions. The instructions may be information regarding how the word or phrase that is the rule was created. Examples of such information include the identification of variables and the meaning of certain symbols, words or phrases included in the rule.

The separate application can translate the word or phrase using the instructions and provide a translated rule to the attribute engine. The translated rule may be in an executable format that includes an identification of the subset of data in the information database 112 and a translated statistical expression. In some embodiments, the attribute engine 106 uses the identification of the subset of data to request the data from the information database 112.

In block 208, the attribute engine 106 receives the subset of data identified using the translated rule from the information database 112. The subset of data includes information on individuals or groups. In some embodiments, the subset of data includes data elements from the information database 112. Each data element includes a certain type of information about an individual or group. The data elements received by the attribute engine 106 can include information that matches the subset identification of the rule. In some embodiments, the subset of data is obtained by performing a filter on a collection of data.

In block 210, the attribute engine 106 generates statistics on the subset of data from the information database 112 using the translated rule. In some embodiments, the attribute engine 106 executes the translated statistical expression to cause the subset to be analyzed using the attributes and parameters included in the translated statistical expression. The result of the analysis may be statistics on the subset. The statistics can include attributes of the subset. For example, the statistics may indicate that one hundred people or thirty percent of individuals over the age of eighteen and living in a specified geographic location have opened at least one tradeline in the last ninety days. Examples of other statistics include a number of bank cards opened in the last ninety days with a balance greater than a selected amount.

In block 212, the interface engine 108 outputs the statistics to the user interface 110. In some embodiments, the attribute engine 106 provides the statistics to the interface engine 108. The interface engine 108 can be configured to format the statistics for display on the user interface 110. The format may be any type of format that can assist the user in reviewing the statistics. FIG. 4 illustrates statistics displayed on a user interface, such as user interface 110. The information shown in FIG. 4 includes a statistic definition that, in some embodiments, may be the word or phrase, or a representation of the word or phrase, received by the attribute engine 106 to generate the statistic result. The statistic result is associated with each statistic definition and is the statistic provided by the attribute engine 106. The user can access the user interface 110 and review the statistics. In some embodiments, the statistics may be automatically transmitted to a location on a network, such as via electronic mail, that is accessible to the user.

Figure 5:
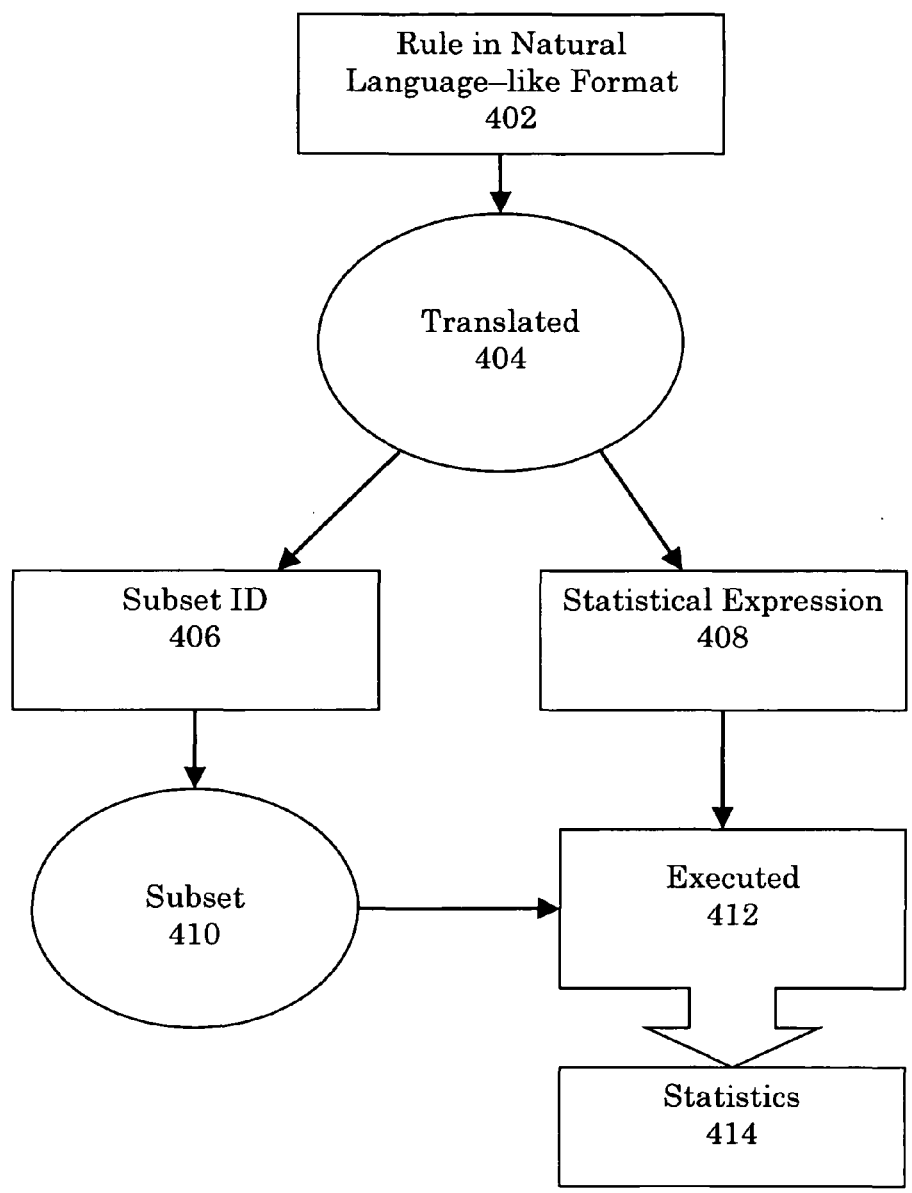
FIG. 5 is a system flow diagram for providing statistics on a subset of data using rules represented by a word or phrase according to one embodiment of the present invention.

Various system flows can be used to implement various embodiments of the present invention to provide statistics or other information associated with a subset of data based on a rule in natural language-like syntax from a user. FIG. 5 illustrates an example of a system flow according to one embodiment of the present invention. A rule in natural language-like format 402. As stated above, the rule may be a grammatical phrase, word, symbol, or other language part that represents an identification of the subset of data on which the user wishes to obtain statistics and other information, and a statistical expression that represents a function to be executed on the subset to provide the statistics or other information.

The rule is translated 404 into an executable format. The rule may be translated 404 using instructions that provide the meaning, at for example machine-readable code level, for certain phrases or other grammatical parts. In some embodiments, the instructions provide meaning based on placement of a word or phrase within the rule. For example, each word, phrase, or symbol in the rule can be mapped using instructions.

The translated rule can include two parts: a subset ID 406 and a statistical expression 408. The subset ID 406 identifies the subset of data on individuals and/or groups on which the business user wishes to receive statistics or other information.

Examples of subset ID 406 include an identification of a particular type of information on individuals or groups, an identification of several types of information on individuals or groups, and an identification of the source of information on individuals or groups. An example of the subset ID 406 that identifies several types of information on individuals or groups is a subset with individuals living within the State of Georgia and over the age of eighteen.

The statistical expression 408 may be a function to apply to the subset of data. The function can include a mathematical equation that can be applied to the subset of data to determine statistics or other information about the subset of data. An example of a function is a mathematical representation of "total number of individuals that opened tradelines within the last ninety days."

The subset ID 406 can be used to obtain the subset 410, such as by requesting the subset 410 from a data source that may be a database. In some embodiments, the subset ID 406 is used to search the data in a database to generate search results that match the subset ID 406. The matched search results may be the subset of data.

The statistical expression 408 is executed 412 on the subset 410 to generate statistics 414. The statistical expression 408 is executed 412 by processing the subset 410 using the statistical expression 408. For example, the data elements in the subset 410 can be analyzed using the attributes, criteria, and relationships provided in the statistical expression 408. The statistics 414 may be the results of an analysis of the subset 410 and provide a user with information with which business decisions can be made or objectives can be implemented. For example, the statistics can indicate whether individuals within a geographic area may be receptive to a marketing campaign for a new tradeline. If the statistics indicate many individuals opened a new tradeline within the last ninety days, they may not be receptive. If the statistics indicate few individuals opened a new tradeline within the last ninety days, they may be receptive.

Other features can be implemented by certain embodiments of the inventions. In some embodiments, an attribute engine can analyze a rule in natural language-like format received from a user to determine if it is complete. If it not complete, the attribute engine can be configured to provide a notice to the user requesting completion of the rule. In some embodiments, a specific request is provided to the user identifying the missing information.

EXAMPLES

Attribute engines according to certain embodiments of the present invention, in conjunction with interface engines or otherwise, can include attribution language that can be used to build custom attributes and defining criteria from custom attributes using credit file data. In one example of the present invention, a bank may wish to determine the total number of tradelines that their customer, John, has opened within the last two years, and if he has opened more than six tradelines in that time, then he will not be extended further credit.

A user may input the phrase "total number of tradelines opened within last 2 years" into a user interface. The attribute engine may recognize the input as an attribute and cause a tree to be displayed that lists selectable words, symbols, or phrases for the next part of the phrase. For example, the tree can list <, >, or =. If the user selects >, then the symbol > is automatically provided in the grammar phrase the user is generating. The user may then input another word, symbol, phrase, or numeric value such as six. The attribute engine may recognize the developing phrase and provide the user with a list of words or phrases, one of which could include "then set decision to decline." The user can select the phrase to develop a complete phrase that represents a rule. In some embodiments, the user can input the rule without the attribute engine generating trees containing selectable options. An example of the complete rule is set forth below:

total number of tradelines opened within last 2 years>6 then set decision to decline In this example, the attribute would be calculated by performing a function on a collection of tradelines and filtering the collection of tradelines by their open status and the open date. The function may be a statistical expression, or part of a statistical expression, that can be translated from the grammar phrase provided. For the function, different aggregate functions could be applied such as minimum, maximum, average, sum, or count. In this example, "count" is applied to the collection of tradelines in order to determine the total number of open lines. The filters may identify the subset of a data set on individuals and/or groups. For example, the data set may be tradelines and the filter is applied to narrow down the collection of data to a smaller, more specific subset on which the function can then be applied. Filters can be simple comparison (<, >, =, <=,>=, !=), logical (true, false), and arithmetic operators (+, −, *, /, %) that operate on objects contained within the collection. Primitive data types supported by the Java programming language can be used as operands in the filter expressions. These data types include integer, float, string, double, long, and Boolean.

For the example above, the filter is implemented by applying a comparison operator on each individual tradelines open date attribute to determine the number of tradelines that have been opened in the last two years. Computed statistics may be available for use within criteria or decision rules. The content of a criteria rule can include one or more calculated custom statistics and/or any other non-calculated data source statistics. In the example provided, the criteria rule contains one calculated custom attribute with a comparison operator. It should be understood, however, that embodiments of the invention can be used with more detailed calculations and statistical analyses. Additionally, in certain embodiments, computed attributes may be cached in memory so that they can be eventually returned and persisted in the database, if required. It may also be desirable for an attribute engine that can build custom models using its inherent ability to perform calculations on data attributes exposed in a data source component.

The following is a mathematical representation, using the example above, of a function performed in accordance with various embodiments of the invention described:

Assume there is a set S, which is a collection of similar type entries, for example, a collection of tradelines, a collection of inquiries, etc. $S=\{s_1, s_2, \ldots, s_n\}$, where $s_i$ is an entry in the collection, e.g. a tradeline. A simple attribute $a_i$ can be represented as $a_i=f(S)$, where function $f$ can be any statistical function such as minimum, maximum, average, count, sum, etc. An entry in the collection S (i.e. $s_i$) may be comprised of multiple elements or properties. For example, if $s_i$ is a tradeline, then the tradeline is comprised of member number, date open, date closed, amount overdue, etc. For example: $s_i=\{e_1, e_2, \ldots, e_k\}$ The statistic calculation can be applied in the context of a specific element of the tradeline. The statistic calculation can be further rewritten (generally speaking, though, functions such as count may not be specifically applied to an element, but, average, minimum, maximum and sum can, i.e. one can "sum" total of the "credit" available, where "credit" is an element of the tradeline) as $a_i=f(F(s.e_i))$, where F represents a filter or transformation function, such as "open" tradelines only. Furthermore, the statistic calculation can combine multiples of such functions and/or other attributes as well, such as:

$$A_i=g(f_1(F_a(s.e_i)),f_2(F_b(s.e_j)),\ldots f_m(F_h(s.e_z)), A_p,\ldots,A_s)$$

In summary, $A_i$—is a statistic that may be a calculated attribute of a subset of data.

g—is an aggregate arithmetic or quadratic function such as +, −, *, /. (It is possible that multiple versions of this function may be used in the calculation of the single statistic.)

$f_j$—is a statistical expression represented by a function such as average, sum, count, minimum, maximum, etc.

$F_a$—identifies a subset of data and is a filter or a transformation function, such as string-to-date, or "only open tradelines," or "exclude tradelines based upon industry-code in the member number," etc.

s—is an entry in the data collection S, such as a tradeline $s.e_k$—is an element that represents a specific value of a collection entry, such as "member number" of the tradeline.

The attribute engine may be adapted to receive the complete rule, determine the mathematical function it represents, and translate the mathematical function into an executable format using instruction rules.

The following provides examples of syntax that allow a user to input a rule and instructions used to translate the rule. The first example is grammar syntax used in writing attributes that utilizes EBNF notation:

```
DefinedName                  =
[abcdefghijklmnopqrstuvwxyzABCDEFGHIJKLMNOPQRSTUVWXYZ0123456789 _-]+
ICset-operator = 'INTERSECTION' | 'UNION' | 'SUBSTRACTION'
ICunary-set-operator = 'NOT'
numeric-value = (−)?[0123456789]+('.'[0123456789]*)?
arithmetic-unary-operator = '−'
ICprimitive-operator = '+' | '−' | '*' | '/'
boolean-separator = 'and' | 'or'
AnAttribute = ICbindings-and-definitions? '\n' ICcomposite-
collection* '\nAn attribute is defined as the \n' ICattributes
ICbindings-and-definitions = ICbinding-or-definition+
ICbinding-or-definition = ICprefixed-binding | DefinedName
ICprefixed-binding = ICset-prefix binding
ICset-prefix = 'set'
binding = DefinedName binding-type
binding-type = simple-binding | object-binding | expression-binding
simple-binding = 'to a ' target condition-tests?
object-binding = 'to' object-path condition-tests?
expression-binding = 'to' arithmetic-expression
target = DefinedName | relation-path
relation-path = DefinedName path? argument*
object-path = DefinedName path? argument*
condition-tests = condition-test nextcondition-test*
nextcondition-test = boolean-separator condition-test
condition-test = not? condition-test-term
condition-test-term = condition-boolean-path condition-tests
condition-boolean-path = DefinedName path? argument*
not = 'it is not true that'
path = DefinedName path? argument*
argument = value | argument-path | arithmetic-expression | argument-list
argument-path = DefinedName path? argument*
argument-list = argument+
arithmetic-expression = operand exprRhs*
exprRhs = ICprimitive-operator operand
operand = arithmetic-unary-operator? term
term = arithmetic-value | arithmetic-expression
arithmetic-value = numeric-value | numeric-path
numeric-path = DefinedName path? argument*
ICattributes = ICattribute ICnext-attribute*
ICnext-attribute = ICprimitive-operator ICattribute
ICattribute = ICattribute-value | ICattributes
ICattribute-value = ICaggregates | ICfunctions | ICdata-value | DefinedName
ICdata-value = ICdata-value-path
ICdata-value-path = DefinedName path? argument*
ICfunctions = ICmin-function | ICmax-function
ICaggregates = ICsum-aggregator | ICcount-aggregator | ICmin-aggregator
 | ICmax-aggregator | ICavg-aggregator
ICcount-aggregator = ICcollection-aggregator-target
ICsum-aggregator = ICaggregator-target
ICmin-aggregator = ICaggregator-target
ICmax-aggregator = ICaggregator-target
ICavg-aggregator = ICaggregator-target
ICmin-function = min-operand+
min-operand = function-choice-operand min-operand-separator
min-operand-separator = ','
ICmax-function = max-operand+
max-operand = function-choice-operand max-operand-separator
max-operand-separator = ','
function-choice-operand = function-object-path | DefinedName
```

```
ICcollection-aggregator-target = ICcollection-aggregator-path
ICaggregator-target = ICaggregator-path
ICcollection-aggregator-path = DefinedName path? argument*
ICaggregator-path = DefinedName path? argument*
function-object-path = DefinedName function-path? function-argument*
function-path = DefinedName function-path? function-argument*
function-argument = DefinedName function-argument-path function-
argument-list
function-argument-path = DefinedName function-path? function-argument*
function-argument-list = function-argument+
ICcomposite-collection = DefinedName ICcollection-expression
ICcollection-expression = ICsimple-collection-expression ICcollection-
expression-RHS*
ICcollection-expression-RHS = ICset-operator ICsimple-collection-
expression
ICsimple-collection-expression = ICunary-set-operator* ICsimple-collection
ICsimple-collection = DefinedName ICcollection-expression
```

The second example is language syntax used in writing attribute definitions utilizing EBNF notations:

```
DefinedName                                                           =
[abcdefghijklmnopqrstuvwxyzABCDEFGHIJKLMNOPQRSTUVWXYZ0123456789 _-]+
numeric-value = (-)?[0123456789]+('.'[0123456789]*)?
ICprimitive-operator = '+' | '-' | '*' | '/'
arithmetic-unary-operator = '-'
boolean-separator = 'and' | 'or'
ICnot = 'it is not true that'
ICrule = ICinterconnect-bindings-and-definitions
ICinterconnect-bindings-and-definitions = ICinterconnect-binding-or-
definition+
ICinterconnect-binding-or-definition = ICinterconnect-prefixed-binding |
DefinedName
ICinterconnect-prefixed-binding = ICinterconnect-set-prefix ICbinding
ICinterconnect-set-prefix = 'set'
ICbinding = DefinedName ICbinding-type
ICbinding-type = ICsimple-binding | ICobject-binding | ICexpression-
binding
ICsimple-binding = 'to a ' ICtarget ICcondition-tests?
ICobject-binding = 'to' ICobject-path ICcondition-tests?
ICexpression-binding = 'to' ICarithmetic-expression
ICtarget = DefinedName | ICrelation-path
ICrelation-path = DefinedName ICpath? ICargument*
ICobject-path = DefinedName ICpath? ICargument*
ICcondition-tests = ICcondition-test ICnextcondition-test*
ICnextcondition-test = boolean-separator ICcondition-test
ICcondition-test = ICnot? ICcondition-test-term
ICcondition-test-term = ICcondition-boolean-path ICcondition-tests
ICcondition-boolean-path = DefinedName ICpath? ICargument*
ICpath = DefinedName ICpath? ICargument*
ICargument = DefinedName | ICargument-path | ICarithmetic-expression |
ICargument-list
ICargument-path = DefinedName ICpath? ICargument*
ICargument-list = ICargument+
ICarithmetic-expression = ICoperand ICexprRhs*
ICexprRhs = ICprimitive-operator ICoperand
ICoperand = arithmetic-unary-operator? ICterm
ICterm = ICarithmetic-value | ICarithmetic-expression
ICarithmetic-value = numeric-value | ICnumeric-path
ICnumeric-path = DefinedName ICpath? ICargument*
```

As shown, certain embodiments allow users, such as business users, to initiate a request for information using natural language-like syntax by forming a rule that includes language representing an identification of a subset of data and a statistical expression to perform on the subset. Methods and systems according to some embodiments use the rule formed using natural language-like syntax to provide information, such as statistics on the subset to users. One benefit of certain embodiments is the ability of a user to create a search without having to decipher or know computer code.

The foregoing description of the embodiments of the invention has been presented only for the purpose of illustration and description and is not intended to be exhaustive or to limit the invention to the precise forms disclosed. Numerous modifications and adaptations are apparent to those skilled in the art without departing from the spirit and scope of the invention. Instead, reference should be made to the one or more claims hereinafter set forth.

What is claimed is:

1. A system comprising:
   a processor configured to execute instructions stored on a non-transitory computer-readable medium, the instructions including:

an interface engine configured for providing a user interface, the user interface including:
 a definitions section that defines subsets of data by (i) displaying a subset assignment operator, (ii) receiving a word or phrase identifying a defined subset, (iii) appending the word or phrase identifying the subset to the subset assignment operator, (iv) appending a selection preposition to the word or phrase identifying the subset, wherein the selection preposition is a word or phrase indicative of selecting a data set from a plurality of data sets of a data source, (v) displaying a list including the plurality of data sets, (vi) receiving input selecting the data set from the list, (vii) appending a word or phrase identifying the selected data set to the selection preposition, (viii) displaying a parameter assignment operator adjacent to the words or phrases identifying the defined subset and the selected data set, (ix) receiving input identifying a parameter for the selected data set, (x) appending a word or phrase identifying the parameter of the data set to the parameter assignment operator, wherein the parameter is usable for specifying the defined subset, (xi) receiving input identifying a value or range of values for the parameter usable for identifying data elements from the data set to be included in the defined subset, and (xii) storing a definition of the subset based on the input received to the user interface, the definition comprising the word or phrase identifying the defined subset, the word or phrase identifying the selected dataset, and the value or range of values for the parameter;
 a composite collections section configured for receiving input identifying a composite subset of data, wherein the composite subset of data comprises at least two subsets of data defined via the definitions section;
 an attribute section configured for receiving input defining a statistical expression to perform on the defined subset of data; and
 a natural language input field configured for receiving a rule via a natural language input, the rule identifying the statistical expression and the defined subset of data; and
 an attribute engine configured for (i) identifying a translator application configured for translating the rule; (ii) providing translation instructions to the translator application, wherein the translation instructions translate the rule into an executable programming language or a machine-readable language by correlating words or phrases in the natural language input to at least one variable and at least one operator based on a mapping for a language of the natural language input (iii) accessing the defined subset of data, (iv) executing the executable programming language or the machine-readable language to obtain statistics on data elements of the defined subset of data in response to receiving the executable programming language or a machine-readable language, and (v) outputting the statistics, wherein the statistics describe an attribute of the defined subset of data.

2. The system of claim 1, wherein the attribute engine is further configured for:
 translating an additional rule identified by additional natural language input to the input filed into an additional executable programming language or an additional machine-readable language, wherein the additional rule comprises an additional statistical expression defined via the attribute section and an additional subset of data defined via the definitions section;
 executing the additional executable programming language or the additional machine-readable language to obtain additional statistics on data elements of the additional subset of data.

3. The system of claim 1, wherein the statistical expression comprises a mathematical function applicable to the defined subset of data to determine the statistics.

4. The system of claim 1, wherein the statistical expression specifies:
 an attribute of the defined subset of data defined via the attribute section;
 a criteria associated with the attribute; and
 a relationship between data elements of the defined subset of data.

5. The system of claim 1, wherein the subset comprises at least one of a type of information for individuals or groups and a source of information for the individuals or groups.

6. The system of claim 1, wherein executing the executable programming language or the machine-readable language to obtain the statistics comprises executing an aggregate arithmetic or quadratic function combining a plurality of statistical functions applied to respective subsets of data, wherein each of the subsets of data is identified by applying a respective filter or transformation function to entries in a data set having a respective specified value.

7. A method comprising:
 defining subsets of data by (i) displaying a subset assignment operator, (ii) receiving a word or phrase identifying a defined subset, (iii) appending the word or phrase identifying the subset to the subset assignment operator, (iv) appending a selection preposition to the word or phrase identifying the subset, wherein the selection preposition is a word or phrase indicative of selecting a data set from a plurality of data sets of a data source, (v) displaying a list including the plurality of data sets, (vi) receiving input selecting the data set from the list, (vii) appending a word or phrase identifying the selected data set to the selection preposition, (viii) displaying a parameter assignment operator adjacent to the words or phrases identifying the defined subset and the selected data set, (ix) receiving input identifying a parameter for the selected data set, (x) appending a word or phrase identifying the parameter of the data set to the parameter assignment operator, wherein the parameter is usable for specifying the defined subset, (xi) receiving input identifying a value or range of values for the parameter usable for identifying data elements from the data set to be included in the defined subset, and (xii) storing a definition of the subset based on the input received to the user interface, the definition comprising the word or phrase identifying the defined subset, the word or phrase identifying the selected dataset, and the value or range of values for the parameter;
 receiving input identifying a composite subset of data, wherein the composite subset of data comprises at least two defined subsets of data;
 receiving input defining a statistical expression to perform on the defined subset of data;
 receiving natural language input identifying the statistical expression and the defined subset of data;
 identifying a translator application configured for translating the rule;
 providing translation instructions to the translator application, wherein the translation instructions translate the rule into an executable programming language or a machine-readable language by correlating words or phrases in the natural language input to at least one variable and at least one operator based on a mapping for a language of the natural language input;

accessing the defined subset of data;

executing the executable programming language or the machine-readable language to obtain statistics on data elements of the defined subset of data in response to receiving the executable programming language or a machine-readable language; and outputting the statistics, wherein the statistics describe an attribute of the defined subset of data.

8. A computer-readable medium on which program code configured for being executed by a processor is stored, the program code comprising:

program code for defining subsets of data by (i) displaying a subset assignment operator, (ii) receiving a word or phrase identifying a defined subset, (iii) appending the word or phrase identifying the subset to the subset assignment operator, (iv) appending a selection preposition to the word or phrase identifying the subset, wherein the selection preposition is a word or phrase indicative of selecting a data set from a plurality of data sets of a data source, (v) displaying a list including the plurality of data sets, (vi) receiving input selecting the data set from the list, (vii) appending a word or phrase identifying the selected data set to the selection preposition, (viii) displaying a parameter assignment operator adjacent to the words or phrases identifying the defined subset and the selected data set, (ix) receiving input identifying a parameter for the selected data set, (x) appending a word or phrase identifying the parameter of the data set to the parameter assignment operator, wherein the parameter is usable for specifying the defined subset, (xi) receiving input identifying a value or range of values for the parameter usable for identifying data elements from the data set to be included in the defined subset, and (xii) storing a definition of the subset based on the input received to the user interface, the definition comprising the word or phrase identifying the defined subset, the word or phrase identifying the selected dataset, and the value or range of values for the parameter;

program code for receiving input identifying a composite subset of data, wherein the composite subset of data comprises at least two defined subsets of data;

program code for receiving input defining a statistical expression to perform on the defined subset of data;

program code for receiving a rule via a natural language identifying the statistical expression and the defined subset of data;

program code for identifying a translator application configured for translating the rule;

program code for providing translation instructions to the translator application, wherein the translation instructions translate the rule into an executable programming language or a machine-readable language by correlating words or phrases in the natural language input to at least one variable and at least one operator based on a mapping for a language of the natural language input;

program code for defined subset of data;

program code for executing the executable programming language or the machine-readable language to obtain statistics on data elements of the defined subset of data in response to receiving the executable programming language or a machine-readable language; and program code for outputting the statistics, wherein the statistics describe an attribute of the defined subset of data.

9. A system comprising:

a processor configured to execute instructions stored on a non-transitory computer-readable medium, the instructions including:

an interface engine configured for providing a user interface, the user interface including:

a definitions section that defines subsets of data by (i) displaying a subset assignment operator, (ii) receiving a word or phrase identifying a defined subset, (iii) appending the word or phrase identifying the subset to the subset assignment operator, (iv) appending a selection preposition to the word or phrase identifying the subset, wherein the selection preposition is a word or phrase indicative of selecting a data set from a plurality of data sets of a data source, (vi) displaying a list including the plurality of data sets, (iv) receiving input selecting the data set from the list, (v) appending a word or phrase identifying the selected data set to the selection preposition, and (vi) storing a definition of the subset based on the input received to the user interface, the definition comprising the word or phrase identifying the defined subset, and the word or phrase identifying the selected dataset; and a natural language input field configured for receiving a rule via a natural language input, the rule identifying the statistical expression and the defined subset of data; and an attribute engine configured for (i) providing translation instructions that translate the rule into an executable programming language or a machine-readable language by correlating words or phrases in the natural language input to at least one variable and at least one operator based on a mapping for a language of the natural language input, (ii) accessing the defined subset of data, (iii) executing the executable programming language or the machine-readable language to obtain statistics on data elements of the defined subset of data, and (iv) outputting the statistics, wherein the statistics describe an attribute of the defined subset of data.

10. The system of claim 9, wherein the definitions section further defines the subsets of data by:

displaying a parameter assignment operator adjacent to the words or phrases identifying the defined subset and the selected data set;

receiving input identifying a parameter for the selected data set; appending a word or phrase identifying the parameter of the data set to the parameter assignment operator, wherein the parameter is usable for specifying the defined subset;

receiving input identifying a value or range of values for the parameter usable for identifying data elements from the data set to be included in the defined subset; and storing the value or range of values for the parameter with the definition of the subset.

11. The system of claim 9, wherein the user interface also includes:

a composite collections section configured for receiving input identifying a composite subset of data, wherein the composite subset of data comprises at least two subsets of data defined via the definitions section; and an attribute section configured for receiving input defining a statistical expression to perform on the defined subset of data.

12. The system of claim 9, wherein the attribute engine is further configured for:
  identifying a translator application configured for translating the rule;
  providing the translation instructions to the translator application; and
  executing the executable programming language or the machine-readable language to obtain statistics on data elements of the defined subset of data in response to receiving the executable programming language or a machine-readable language.

13. A system comprising:
  a processor configured to execute instructions stored on a non-transitory computer-readable medium, the instructions including:
  an interface engine configured for providing a user interface, the user interface including a natural language input field configured for receiving a rule via a natural language input, the rule identifying including a statistical expression to perform on a defined subset of data and the defined subset of data; and
  an attribute engine configured for (i) providing translation instructions that translate the rule into an executable programming language or a machine-readable language by correlating words or phrases in the natural language input to at least one variable and at least one operator based on a mapping for a language of the natural language input, (ii) accessing the defined subset of data, (iii) executing the executable programming language or the machine-readable language to obtain statistics on data elements of the defined subset of data by executing an aggregate arithmetic or quadratic function combining a plurality of statistical functions applied to respective subsets of data, wherein each of the subsets of data is identified by applying a respective filter or transformation function to entries in a data set having a respective specified value, and (iv) outputting the statistics, wherein the statistics describe an attribute of the defined subset of data.

14. The system of claim 13, wherein the user interface also includes:
  a definitions section that defines subsets of data by (i) displaying a subset assignment operator, (ii) receiving a word or phrase identifying the defined subset, (iii) appending the word or phrase identifying the subset to the subset assignment operator, (iv) appending a selection preposition to the word or phrase identifying the subset, wherein the selection preposition is a word or phrase indicative of selecting a data set from a plurality of data sets of a data source, (v) displaying a list including the plurality of data sets, (vi) receiving input selecting the data set from the list, (vi) appending a word or phrase identifying the selected data set to the selection preposition, (viii) displaying a parameter assignment operator adjacent to the words or phrases identifying the defined subset and the selected data set, (ix) receiving input identifying a parameter for the selected data set, (x) appending a word or phrase identifying the parameter of the data set to the parameter assignment operator, wherein the parameter is usable for specifying the defined subset, (xi) receiving input identifying a value or range of values for the parameter usable for identifying data elements from the data set to be included in the defined subset, and (xii) storing a definition of the subset based on the input received to the user interface, the definition comprising the word or phrase identifying the defined subset, the word or phrase identifying the selected dataset, and the value or range of values for the parameter.

15. The system of claim 14, wherein the user interface also includes a composite collections section configured for receiving input identifying a composite subset of data, wherein the composite subset of data comprises at least two subsets of data defined via the definitions section.

16. The system of claim 15, wherein the user interface also includes an attribute section configured for receiving input defining the statistical expression.

17. The system of claim 13, wherein the attribute engine is further configured for:
  identifying a translator application configured for translating the rule;
  providing the translation instructions to the translator application; and
  executing the executable programming language or the machine-readable language to obtain statistics on data elements of the defined subset of data in response to receiving the executable programming language or a machine-readable language.

18. The system of claim 13, wherein the statistical expression comprises a mathematical function applicable to the defined subset of data to determine the statistics.

19. The system of claim 13, wherein the statistical expression specifies:
  an attribute of the defined subset of data;
  a criteria associated with the attribute; and
  a relationship between data elements of the defined subset of data.

* * * * *

UNITED STATES PATENT AND TRADEMARK OFFICE
CERTIFICATE OF CORRECTION

PATENT NO. : 8,700,597 B2
APPLICATION NO. : 12/186682
DATED : April 15, 2014
INVENTOR(S) : Sandeep Gupta et al.

It is certified that error appears in the above-identified patent and that said Letters Patent is hereby corrected as shown below:

On the Title Page

On page 3, in column 1, under "Other Publications", line 37, delete "26," and insert -- 28, --, therefor.

On page 3, in column 1, under "Other Publications", line 40, delete "to" and insert -- for --, therefor.

On page 3, in column 2, under "Other Publications", line 45, delete "Mangivacchi," and insert -- Mangiavacchi, --, therefor.

On page 3, in column 2, under "Other Publications", line 49, delete "Niedemair," and insert -- Niedermair, --, therefor.

On page 3, in column 2, under "Other Publications", line 49, delete "gesrprochener" and insert -- gesprochener --, therefor.

On page 3, in column 2, under "Other Publications", line 57, delete "Responses" and insert -- Response --, therefor.

Signed and Sealed this
Second Day of December, 2014

Michelle K. Lee
*Deputy Director of the United States Patent and Trademark Office*